No. 658,067. Patented Sept. 18, 1900.
C. J. KIELBERG.
APPARATUS FOR MAKING CEMENT PIPES.
(Application filed Oct. 2, 1899.)

(No Model.) 2 Sheets—Sheet 1.

Witnesses: Inventor,
J. D. Garfield Carl Johan Kielberg
H. D. Clemons by
Attorneys.

THE NORRIS PETERS CO., PHOTO-LITHO., WASHINGTON, D. C.

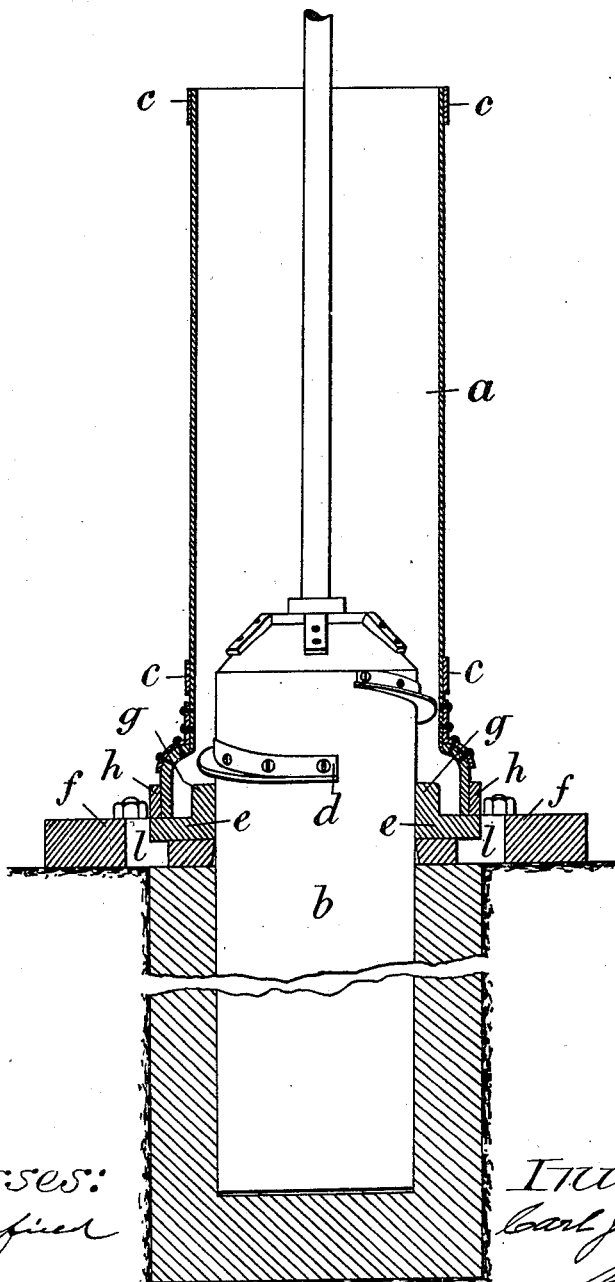

UNITED STATES PATENT OFFICE.

CARL JOHAN KIELBERG, OF COPENHAGEN, DENMARK.

APPARATUS FOR MAKING CEMENT PIPES.

SPECIFICATION forming part of Letters Patent No. 658,067, dated September 18, 1900.

Application filed October 2, 1899. Serial No. 732,273. (No model.)

*To all whom it may concern:*

Be it known that I, CARL JOHAN KIELBERG, polytechnical examiner, a citizen of the Kingdom of Denmark, residing at Vester Voldgade 14, Copenhagen, Denmark, have invented certain new and useful Improvements in Apparatus for Making Cement Pipes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improved apparatus for making cement pipes either with or without a collar thereon, the object being to provide improved mechanism for producing pipes made of cement, whereby the material of which said pipes are made is so manipulated that a more solid and a stronger pipe is produced than those heretofore made in the ordinary way; and the invention consists in the peculiar construction and arrangement of the pipe-forming machinery whereby the above-mentioned object is attained.

Figure 1:
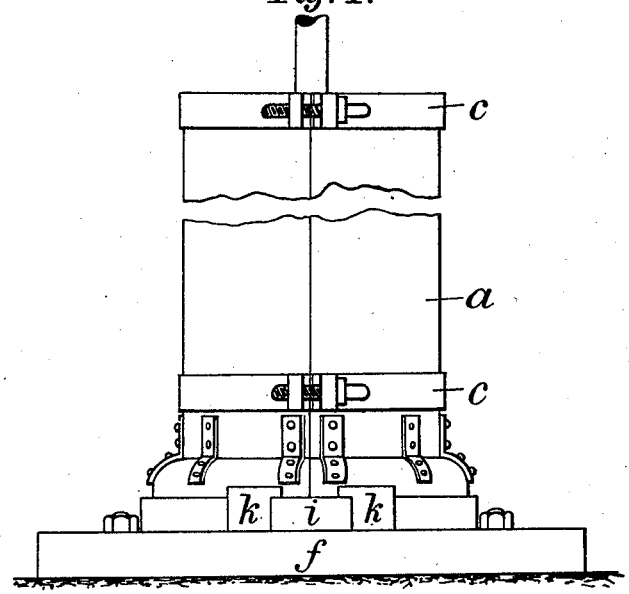
Figure 2:
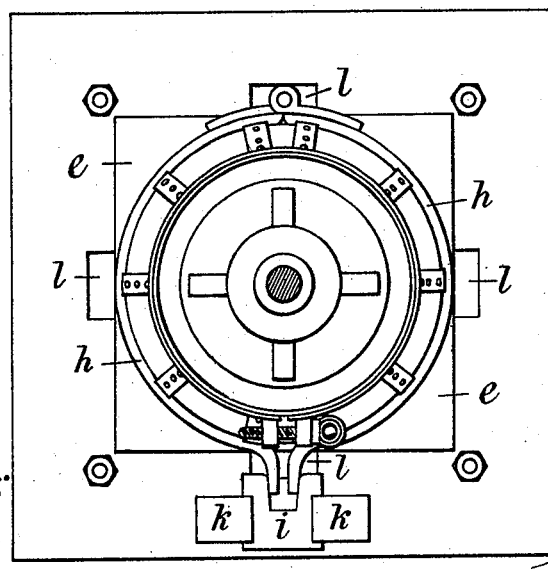

In the drawings forming part of this specification, Figure 1 is a front elevation, and Fig. 2 is a top plan view, of a pipe-making machine constructed according to my invention. Fig. 3 is a vertical section through the mold of the machine.

Referring to the drawings, the mold in which the pipe is formed consists of two half-sections $a$, preferably of iron, held in united relations, as shown, by the iron bands $c$. The collar forming part of the mold (shown at the lower end thereof) is of cast-iron and is secured to the mold by means of an angle-iron, as shown, and bolts passing through said angle-iron and the meeting ends of said mold and collar and riveted thereto.

$b$ represents the drum which constitutes the core of the pipe which is to be formed, operating, as below described, in said mold. This drum consists of a metallic cylinder closed at both ends by wooden or other heads. Near the upper end of the drum a rib or projecting strip $d$, preferably of angle-iron, is secured to the surface thereof in a position inclined to the axis thereof or spirally, and said rib extends substantially once around the drum. The lower end of said rib or strip $d$ for a short distance from its extremity extends in a line at a right angle to the axis of said drum or horizontally.

The mold is supported on a pallet $e$, preferably of wood, having a flat bottom which rests upon a cast-iron base $f$, which is secured to a suitable foundation by bolts, as shown, said foundation being located, preferably, in the ground and having a cylindrical chamber to receive the said drum $b$. Said pallet $e$, as well as the iron base $f$, has an opening therethrough corresponding to the diameter of the drum, and the pallet is provided with the upstanding circular border $g$. The said drum is lowered through the pallet into said cylindrical chamber or cavity, as shown in Fig. 3, and when so lowered to its downmost position the lower end of the aforesaid rib or projecting strip $d$ will be brought near to said pallet part $g$ or against the same. After placing the mold in position upon said pallet $e$ it is there locked in place by means of a clamp-block $i$, which has an opening in one side to receive the extremities of the ring-shaped spanner $h$, (see Fig. 2,) which surrounds and is secured to the base of the mold, said clamp-block sliding between and held in place by the lugs $k$. The piston-like shaft shown within and projecting above said mold and secured to the drum $b$ is adapted to be connected with any suitable motor mechanism whereby the mold is rotated when the pipes are being formed by the machine, such connection also permitting said shaft to slide vertically therein when so rotating, a common and convenient means for such shaft connection being a gear or pulley running horizontally, through the hub of which said shaft may extend, and having a spline connection therewith.

The above-described apparatus is operated as follows in making cement pipes: The mold is placed in a position where it rests upon the pallet $e$ and is there secured, as described, the drum $b$ being pressed fully down until brought substantially to the position shown in Fig. 3, with the lower end of said rib $d$ in the position relative to the upstanding circular border $g$ of the pallet shown in said last-named figure. The cement mortar of which a pipe is to be made is now placed in the mold from above upon and around the top of said drum, falling between the latter and the inner walls of the mold-sections $a$. Power is then applied to said shaft, the drum being rotated causing it by the engagement of its said rib $d$ with the mortar to compress and solidify the latter between the drum and the mold, the weight of the drum forcing the mortar strongly downward, first filling the collar-pallet and then solidly building the body of the pipe between the core and the mold upward to complete its length, and, finally, said rib extremity, which extends at a right angle to the axis of said drum, moves around against the end of the pipe-body opposite its collar-bearing end and smoothes and finishes the same. The drum $b$, constituting the core of the pipe, is then drawn up by any suitable means applied to its shaft away from the mold and the spanner $h$ is opened, and the mold, with the green cement pipe therein, is carried away upon the pallet $e$ to the drying-yard. To aid in so moving the pallet and mold, the base $f$ is provided with several hand holes or openings $l$. After a certain time the mold is removed and the pipe therein is left in the drying-yard to dry on the pallet. The mold is then again placed upon another pallet, which replaces the first one on said base $f$, and another pipe is made as before. If preferred, two spiral ribs $d$ may be carried on said drum instead of one, or the one rib shown may be made in two sections and fixed on opposite sides of the drum, each ending below in a horizontal lap. This last-described arrangement of the said ribs is preferable when forming large pipes, for thereby the mortar will be more firmly forced out into the collar, for the reason that both of the spiral ribs act at once upon the mortar at the bottom of the mold and in two places or on opposite sides thereof.

If it be desired to produce pipes without collars, the collar-forming part of the mold may be removed. In casting large pipes it is preferable that the drum be slightly tapering or of slightly-larger diameter at the upper end, thereby reducing the friction against the bottom plates thereof when it is removed from the pipe.

The production of pipes by the use of the within-described improved devices is much more rapid than by means heretofore employed. The pipes so produced are smoother and the material or mortar is rendered more homogeneous and solid, and consequently stronger pipes are made.

Having thus described my invention, what I claim, and desire to secure by Letters Patent of the United States, is—

A device for forming pipes from cement mortar comprising a pipe-core $b$, a laterally-projecting rib $d$, extending on the surface of said core in part, spirally, and in part at right angles to the axis thereof, a shaft fixed to the upper end of said core in line with the axis thereof for connection with suitable mechanism whereby said core may be rotated and guided in a movement in line with the axis thereof, combined with the fixed mold $a$ above said core, through which said shaft extends upwardly, in which the core may move in said axial line, a support for said mold, and a core-receiving chamber below said mold, substantially as described.

In testimony that I claim the foregoing as my invention I have signed my name in presence of two subscribing witnesses.

CARL JOHAN KIELBERG.

Witnesses:
H. FLEISCHER,
C. F. C. C. BRACKER.